No. 693,915. Patented Feb. 25, 1902.
G. L. SMITH.
COMPOUND LUMBER OR STRUCTURE.
(Application filed June 22, 1901.)
(No Model.)
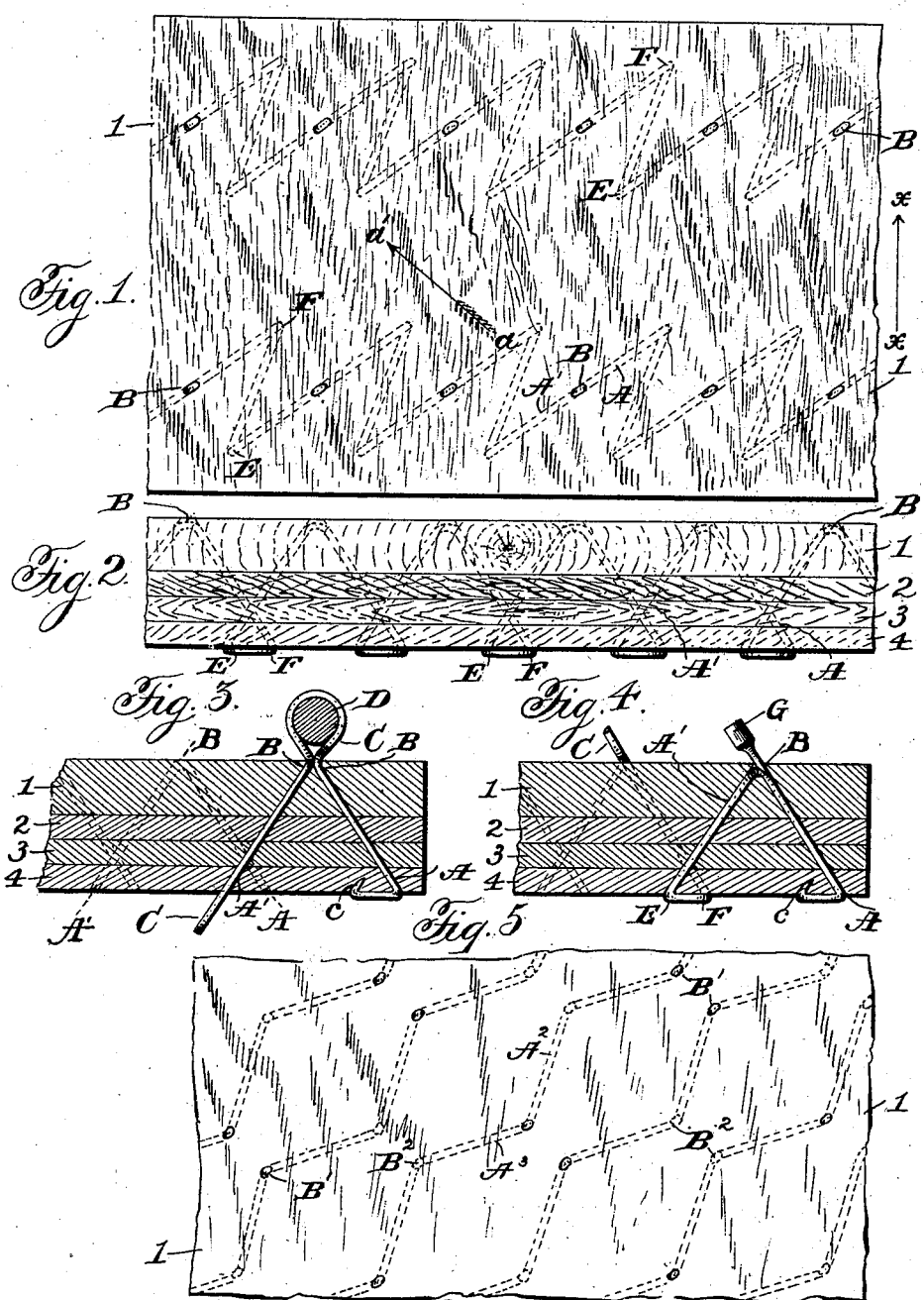
WITNESSES
Jas. E. Hutchinson
M. ?. Sehley
INVENTOR
Geoffrey L. Smith,
by ?. ?. Hudson
Attorney

UNITED STATES PATENT OFFICE.

GODFREY LEWIS SMITH, OF NEWPORT NEWS, VIRGINIA.

COMPOUND LUMBER OR STRUCTURE.

SPECIFICATION forming part of Letters Patent No. 693,915, dated February 25, 1902.

Application filed June 22, 1901. Serial No. 65,639. (No model.)

*To all whom it may concern:*

Be it known that I, GODFREY LEWIS SMITH, residing in Newport News, in the county of Warwick and State of Virginia, have invented certain new and useful Improvements in Compound Lumber or Structures; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a compound structure for use in making or building certain articles, such as boats, panels, furniture, or other articles of manufacture, wherein it is of advantage to save weight, give stiffness, or to avoid warping; and the object of my invention is to provide adequate means for securing the layers of the structure together and to provide at least one smooth surface for the finished structure.

To effect the objects stated, the several layers forming the compound structure are first placed in the position they are to occupy relative to each other or one another when in the finished article, and holes are bored by suitable means having in general a direction at an angle other than ninety degrees with the outer and inner surfaces of the structure. Through these holes are passed wires or cables of copper or other suitable material, the same being hove up tightly and the ends secured, so that the several layers are firmly united and will offer greater resistance to bending or shearing than the collective layers before being so united.

In order to clearly demonstrate the features of my invention, I will proceed to describe them in detail in conjunction with the accompanying drawings, forming a part hereof, and in which—

Figure 1 is an elevation looking to the outer surface of the compound structure made in accordance with my invention. Fig. 2 is an end view of the same. Figs. 3 and 4 are detail sectional views illustrating the direction in which the holes run through the structure and the manner of threading the wire or cable through the holes; and Fig. 5 is an elevation of a modified form of the compound structure embodying certain features of my invention, while Fig. 6 is an end view of the same.

In Figs. 1 to 4 of the drawings the compound structure is illustrated as embracing four layers of wood 1, 2, 3, and 4, the first layer having its grain running in the direction $x\ x$, the second layer having its grain running in the direction of the arrow $a\ a'$, Fig. 1 of the drawings, approximately, the third layer having its grain approximately perpendicular to the grain of the first layer, and the fourth layer having its grain perpendicular approximately to the grain of the second layer, this construction being considered the best adapted for strength and rigidity. However, it is to be understood that the number and thickness of the layers may vary from two up to any number desired, and that instead of using wood for the layers I may use metal, papier-mâché, or any suitable material for any or all of the layers, and also that there may be inserted cloth, rubber, cement, glue, or other waterproof or adhesive materials between any pair or pairs of the layers, such inserted material not being shown because my invention does not lie therein. Through the several layers holes $A\ A'$ are pierced or bored at an angle other than ninety degrees with the outer and inner surfaces of the structure, said holes having their axes coincident in pairs at the surface in points such as B and lying in the same plane approximately normal to the surface. These holes may be accurately and rapidly bored by any device suitable for the purpose.

The method which I have adopted for sewing and finishing the layers of material is clearly illustrated in Figs. 3 and 4 of the drawings, where the end of the strand C, which may be copper wire or other suitable material, is secured, as shown at c, or otherwise. The other end of the wire is then passed out through the hole or perforation A B, bent back at an acute angle, passed through the hole or perforation B A', and a loop formed about a suitable tapered pin D, as illustrated in Fig. 3, the axis of the pin being kept normal to the plane of the two holes. Tension being applied to the wire in the direction B A' and the pin D gradually withdrawn, the loop becomes gradually smaller until on the complete withdrawal of the pin the loop disappears below the surface, as shown in Fig. 4. The wire is then drawn taut and bent sharply at E, being given the direction E F, corresponding to E F in Figs. 1 and 2. After being inserted in the second hole or perforation A and bent sharply at F, (tension being continued,) the above operation is repeated until the seam or row of stitches formed by one strand is complete. In practice the holes B of each "seam" may alternate horizontally with those in the adjacent seams, although in some cases they may be in the same horizontal or longitudinal line. A fine finish may be obtained by driving conical plugs G of suitable material into the openings B, where the axes of each pair of perforations A A' are coincident, as illustrated in Fig. 4 of the drawings, these plugs being afterward cut off flush with the outer surface.

My invention is of particular advantage in boat-building, for by its use I am enabled to obtain water-tightness without the necessity of calking seams, and hence a great saving in weight, as the skin may be made thinner for the same strength and transverse members, such as ribs, dispensed with, as transverse strength and continuity are obtained by the diagonal and transverse layers and the copper or other strand itself.

In my method of securing the layers of the compound structure together I have done what has never before been accomplished so far as I know. I have made use of the tensile strength of the securing-wire in addition to its shearing strength not only to hold the layers securely together, but to resist the other strains occurring in such a structure as a boat or a panel. In all such structures any pressure applied to the unsupported surface gives rise to a bending action, which results in a shearing force parallel to the surface and tension or compression in the fibers of the layers, the intensity of the latter varying from zero at the neutral axis to a maximum at the two surfaces. Now the wire or other strand, as I arrange it, not only resists the shearing force by virtue of its greater shearing strength, (it being something like ten times as strong as wood in that particular,) but the shearing strength of the wire is brought into play to resist bending and rupture. By virtue of the sharp bends at E and F and the fact that, as shown, the wires E F lie normal to the grain of the inside layer the wire is prevented from "working" back and forth within the structure as the surface is pressed or pulled. Greater stiffness is thus obtained and the life of the structure thereby increased.

In Figs. 5 and 6 of the drawings I have illustrated a modification having certain features of the invention hereinbefore described, the compound structure, as shown in this modification, embracing four layers, with the grain of the wood of each layer running as in the form first described. In this modification the holes or perforations $A^2$ $A^3$ are pierced or bored, so as to have in general a direction at an angle other than ninety degrees with the outer and inner surfaces of the structure, and the axes of the holes or perforations are coincident in pairs at both surfaces of the compound structure, the plane containing each series of holes or seams being oblique to the surface, and a tapering pin is employed, as in the method practiced in making the first form described. In this form, as in the first one, the wire or strand will lie below the surface at the point of coincidence of the axes of the series of perforations, the point of coincidence of one surface being indicated at B' and on the other surface at $B^2$, and conical plugs will be driven in at these points, as in the first form, and then cut off flush with the surfaces, so as to form smooth surfaces, as before described. It will be observed that in this modified form, as well as in the first form, the perforations or holes have a direction at an angle other than ninety degrees with the surfaces and also that each seam lies in a plane oblique to the surfaces. Attention is also directed to the fact that the apertures or perforations in the surface of the structure made by the coincidence of the axes of the perforations in pairs is merely for the purpose of enabling the direction of the wires to be changed in passing from one perforation of a pair into the other. It will also be observed under the first form of the invention described that while the axes of the perforations are coincident in pairs at one side of the structure the same perforations at the other side of the structure are spaced apart, and that on this side of the structure the perforations thus spaced apart are connected together by the wire extending from one perforation to the other, and that this wire extends in the direction E F and imparts additional strength to the compound structure by reason thereof, and while this form of the invention is considered best, because of the greatest strength obtained thereby, yet the advantages of certain features of my invention are obtained under the modified form illustrated and described in reference to Figs. 5 and 6 of the drawings. It will be further observed that by having the strand running through the layers, as described, it extends at an angle, so as to increase the strength against either tensile or shearing strain beyond that of a right-angular cross-section of the strand by presenting an elongated cross-section of the strand to the layers.

Having described my invention and set forth its merits, what I claim is—

1. A compound structure composed of superposed layers of material, the layers having a series of perforations throughout their extent having a direction varying substantially from an angle of ninety degrees, and being secured together by a strand passing through said perforations, substantially as described.

2. A compound structure composed of superposed layers of material, the layers having a series of perforations throughout their extent having a direction at an angle other than ninety degrees, the axes of said perforations being coincident in pairs at the surface of the structure, and a strand passing through said perforations and lying below the surface at the point of coincidence of the axes of the perforations, substantially as described.

3. A compound structure composed of superposed layers of material, the layers having a series of perforations throughout their extent having a direction at an angle other than ninety degrees, said perforations being spaced apart on one side of the structure and on the other side having their axes coincident in pairs, and a strand passing through said perforations, said strand connecting the perforations on the side of the structure where the perforations are spaced apart and on the opposite side of the structure lying within the apertures formed by the coincidence of the axes of the perforations in pairs, substantially as described.

4. A compound structure composed of superposed layers of material, the layers having a series of perforations throughout their extent having a direction at an angle other than ninety degrees and extending obliquely to a vertical plane through the series of perforations of each "seam" or row, and a strand passing through the series of perforations, substantially as described.

5. A compound structure composed of superposed layers of material, the layers having a series of perforations throughout their extent having a direction at an angle other than ninety degrees, the axes of said perforations being coincident in pairs at the surface of the structure, a strand passing through said perforations and lying below the surface at the point of coincidence of the axes of the perforations, and plugs fitting in the perforations at the point of coincidence to form a smooth surface at such points, substantially as described.

6. A compound structure composed of superposed layers of material, and strands threaded through the several layers at an angle so as to increase the strength against either tensile or shearing strain beyond that of a right-angular cross-section of the strand by presenting an elongated cross-section of the strand to the layers, substantially as described.

In testimony whereof I affix my signature in presence of two witnesses.

GODFREY LEWIS SMITH.

Witnesses:
W. SCOTT BRYENTON,
W. T. CHAPIN.